(12) United States Patent
Chakraborty et al.

(10) Patent No.: US 10,681,725 B2
(45) Date of Patent: Jun. 9, 2020

(54) TECHNIQUES AND APPARATUSES FOR UNICAST SYSTEM INFORMATION DELIVERY FOR CONNECTED MODE USER EQUIPMENT

(71) Applicant: QUALCOMM Incorporated, San Diego, CA (US)

(72) Inventors: Kaushik Chakraborty, San Diego, CA (US); Tao Luo, San Diego, CA (US); Sumeeth Nagaraja, San Diego, CA (US); Keiichi Kubota, San Diego, CA (US); Makesh Pravin John Wilson, San Diego, CA (US); Juan Montojo, San Diego, CA (US); Xiao Feng Wang, San Diego, CA (US); Sony Akkarakaran, Poway, CA (US); Wooseok Nam, San Diego, CA (US)

(73) Assignee: Qualcomm Incorporated, San Diego, CA (US)

(*) Notice: Subject to any disclaimer, the term of this patent is extended or adjusted under 35 U.S.C. 154(b) by 0 days.

(21) Appl. No.: 16/004,179

(22) Filed: Jun. 8, 2018

(65) Prior Publication Data

US 2018/0368171 A1 Dec. 20, 2018

Related U.S. Application Data

(60) Provisional application No. 62/520,485, filed on Jun. 15, 2017.

(51) Int. Cl.
*H04W 72/14* (2009.01)
*H04W 48/14* (2009.01)
(Continued)

(52) U.S. Cl.
CPC .............. *H04W 72/14* (2013.01); *H04W 4/06* (2013.01); *H04W 24/08* (2013.01); *H04W 48/14* (2013.01); *H04W 48/12* (2013.01); *H04W 84/045* (2013.01)

(58) Field of Classification Search
None
See application file for complete search history.

(56) References Cited

U.S. PATENT DOCUMENTS 6,628,946 B1 * 9/2003 Wiberg ................. H04W 48/12
 455/434
9,693,329 B2 * 6/2017 Wang ................... H04W 56/001
(Continued)

FOREIGN PATENT DOCUMENTS

WO WO-2015103947 A1 * 7/2015 .............. H04W 4/06

OTHER PUBLICATIONS

International Search Report and Written Opinion—PCT/US2018/036836—ISA/EPO—dated Aug. 2, 2018.
(Continued)

*Primary Examiner* — Hong S Cho
(74) *Attorney, Agent, or Firm* — Harrity & Harrity, LLP (57) ABSTRACT

Certain aspects of the present disclosure generally relate to wireless communication. In some aspects, a user equipment may determine that a signal characteristic of a unicast signal is better than a signal characteristic of a broadcast signal; and/or transmit, based at least in part on the determination, a request for an update to a master information block or a minimum system information block to be provided to the user equipment using the unicast signal. In some aspects, a base station may determine that a signal characteristic of a unicast signal associated with a user equipment (UE) is better than a signal characteristic of a broadcast signal broadcasted by the base station; and/or transmit, based on
(Continued)

the determination, an update to a master information block (MIB) or a minimum system information block (MSIB) to the UE using the unicast signal. Numerous other aspects are provided.

28 Claims, 7 Drawing Sheets (51) Int. Cl.
*H04W 4/06* (2009.01)
*H04W 24/08* (2009.01)
*H04W 48/12* (2009.01)
*H04W 84/04* (2009.01)

(56) References Cited

U.S. PATENT DOCUMENTS

| | | | | |
|---|---|---|---|---|
| 2008/0137637 A1* | 6/2008 | Cho | | H04W 48/12 370/349 |
| 2008/0267144 A1* | 10/2008 | Jano | | H04L 67/2819 370/338 |
| 2009/0092073 A1* | 4/2009 | Doppler | | H04B 7/022 370/315 |
| 2012/0009927 A1* | 1/2012 | Farnsworth | | H04W 36/12 455/436 |
| 2012/0124182 A1* | 5/2012 | Hyldgaard | | H04L 12/2874 709/219 |
| 2014/0126454 A1 | 5/2014 | Zhang et al. | | |
| 2015/0016419 A1* | 1/2015 | Kim | | H04W 36/04 370/331 |
| 2015/0245276 A1* | 8/2015 | Lee | | H04W 40/246 370/254 |
| 2016/0157235 A1* | 6/2016 | Xue | | H04W 72/0453 370/329 |
| 2016/0286512 A1* | 9/2016 | Wang | | H04W 56/001 |
| 2016/0308684 A1* | 10/2016 | Zhu | | H04W 4/06 |
| 2017/0111886 A1* | 4/2017 | Kim | | H04W 72/042 |
| 2017/0142766 A1* | 5/2017 | Kim | | H04W 48/20 |
| 2017/0150428 A1* | 5/2017 | Nory | | H04W 48/10 |
| 2017/0223690 A1* | 8/2017 | Zeng | | H04W 4/06 |

OTHER PUBLICATIONS

New Postcom: "Consideration of Signaling for Detection of SS and MIB/SIB1", 3GPP Draft; R1-122099 Views on Detection of SS, MIB and SIB1 for 9DB BIAS, 3rd Generation Partnership Project (3GPP), Mobile Competence Centre; 650, Route Des Lucioles; F-06921 Sophia-Antipolis Cedex; France, vol. RAN WG1, No. Prague, Czech Republic; May 21, 2012-May 25, 2012, May 12, 2012 (May 12, 2012), 3 Pages, XP050600388, [retrieved on May 12, 2012].

* cited by examiner

TECHNIQUES AND APPARATUSES FOR UNICAST SYSTEM INFORMATION DELIVERY FOR CONNECTED MODE USER EQUIPMENT

CROSS-REFERENCE TO RELATED APPLICATIONS UNDER 35 U.S.C. § 119

This application claims priority to Provisional Patent Application No. 62/520,485, filed on Jun. 15, 2017, entitled "TECHNIQUES AND APPARATUSES FOR UNICAST SYSTEM INFORMATION DELIVERY FOR CONNECTED MODE USER EQUIPMENT," which is hereby expressly incorporated by reference herein.

INTRODUCTION

Aspects of the present disclosure generally relate to wireless communication, and more particularly to techniques and apparatuses for unicast system information delivery for connected mode user equipment.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, etc.). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, Long Term Evolution (LTE), and New Radio (NR).

A wireless communication network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method for wireless communication may include determining, by a user equipment (UE), that a signal characteristic of a unicast signal is better than a signal characteristic of a broadcast signal; and transmitting, based at least in part on the determination, a request for an update to a master information block and/or a minimum system information block to be provided to the UE using the unicast signal.

In some aspects, a UE for wireless communication may include a memory and one or more processors configured to determine that a signal characteristic of a unicast signal is better than a signal characteristic of a broadcast signal; and transmit, based at least in part on the determination, a request for an update to a master information block and/or a minimum system information block to be provided to the UE using the unicast signal.

In some aspects, a non-transitory computer-readable medium may store one or more instructions for wireless communication. The one or more instructions, when executed by one or more processors of a UE, may cause the one or more processors to determine that a signal characteristic of a unicast signal is better than a signal characteristic of a broadcast signal; and transmit, based at least in part on the determination, a request for an update to a master information block and/or a minimum system information block to be provided to the UE using the unicast signal.

In some aspects, an apparatus for wireless communication may include means for determining that a signal characteristic of a unicast signal is better than a signal characteristic of a broadcast signal; and means for transmitting, based at least in part on the determination, a request for an update to a master information block and/or a minimum system information block to be provided to the apparatus using the unicast signal.

In some aspects, a method for wireless communication may include determining, by a user equipment (UE), that a signal characteristic of a unicast signal is better than a signal characteristic of a broadcast signal; and transmitting, based at least in part on the determination, a request for an update to a master information block and/or a minimum system information block to be provided to the UE using the unicast signal.

In some aspects, a UE for wireless communication may include a memory and one or more processors configured to determine that a signal characteristic of a unicast signal is better than a signal characteristic of a broadcast signal; and transmit, based at least in part on the determination, a request for an update to a master information block and/or a minimum system information block to be provided to the UE using the unicast signal.

In some aspects, a non-transitory computer-readable medium may store one or more instructions for wireless communication. The one or more instructions, when executed by one or more processors of a UE, may cause the one or more processors to determine that a signal characteristic of a unicast signal is better than a signal characteristic of a broadcast signal; and transmit, based at least in part on the determination, a request for an update to a master information block and/or a minimum system information block to be provided to the UE using the unicast signal.

In some aspects, an apparatus for wireless communication may include means for determining that a signal characteristic of a unicast signal is better than a signal characteristic of a broadcast signal; and means for transmitting, based at least in part on the determination, a request for an update to a master information block and/or a minimum system information block to be provided to the apparatus using the unicast signal.

Aspects generally include a method, a user equipment, a non-transitory computer-readable medium, and a computer program product as substantially described herein with reference to and as illustrated by the accompanying specification and drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

A UE may communicate with a base station (e.g., an eNB, a gNB, and/or the like) based at least in part on system information. For example, the UE may receive broadcast system information, such as a system information block (SIB), a master information block (MIB), a minimum system information block (MSIB), and/or the like. The broadcast system information may identify system timing, cell information, and/or the like, which may be used by the UE to initiate a radio resource control (RRC) connected mode with the base station. Once the UE has entered the RRC connected mode, the UE can communicate with the base station using scheduled resources. For a UE in an RRC connected mode, some system information can be provided via dedicated signaling. The system information provided via dedicated signaling can include, for example, UE-specific system information, on-demand system information, other system information (OSI), and/or the like.

In high-frequency wireless systems, such as millimeter wave (mmWave) systems, unicast signaling (or dedicated signaling) may have better coverage than broadcast signaling due to the increased beam management and refinement in comparison to broadcast signaling. As a result, if system information, such as a MIB and/or MSIB, is only transmitted using broadcast signaling, radio link performance may be limited by the broadcast signaling performance.

Techniques and apparatuses described herein may provide a UE, in an RRC connected mode, to determine that a signal characteristic of a unicast signal is better than a signal characteristic of a broadcast signal, and to request or receive a MIB and/or MSIB (or updates to a MIB and/or MSIB) to be provided to the UE using the unicast signal. In some aspects, a base station may grant (or deny) the request, and may accordingly provide the MIB and/or MSIB via a unicast signal (e.g., a mmWave signal, a beamformed signal, and/or the like) to the UE. By using the unicast signal, coverage of the MIB and/or MSIB may be improved, which improves performance of the cellular network.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Using the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over another aspect.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, etc. (collectively referred to as "elements"). These elements may be implemented using hardware, software, or combinations thereof. Whether such elements are implemented as hardware or software depends upon the particular application and design constraints imposed on the overall system.

It is noted that while aspects may be described herein using terminology commonly associated with 3G and/or 4G wireless technologies, aspects of the present disclosure can be applied in other generation-based communication systems, such as 5G and later, including NR technologies.

Figure 1:
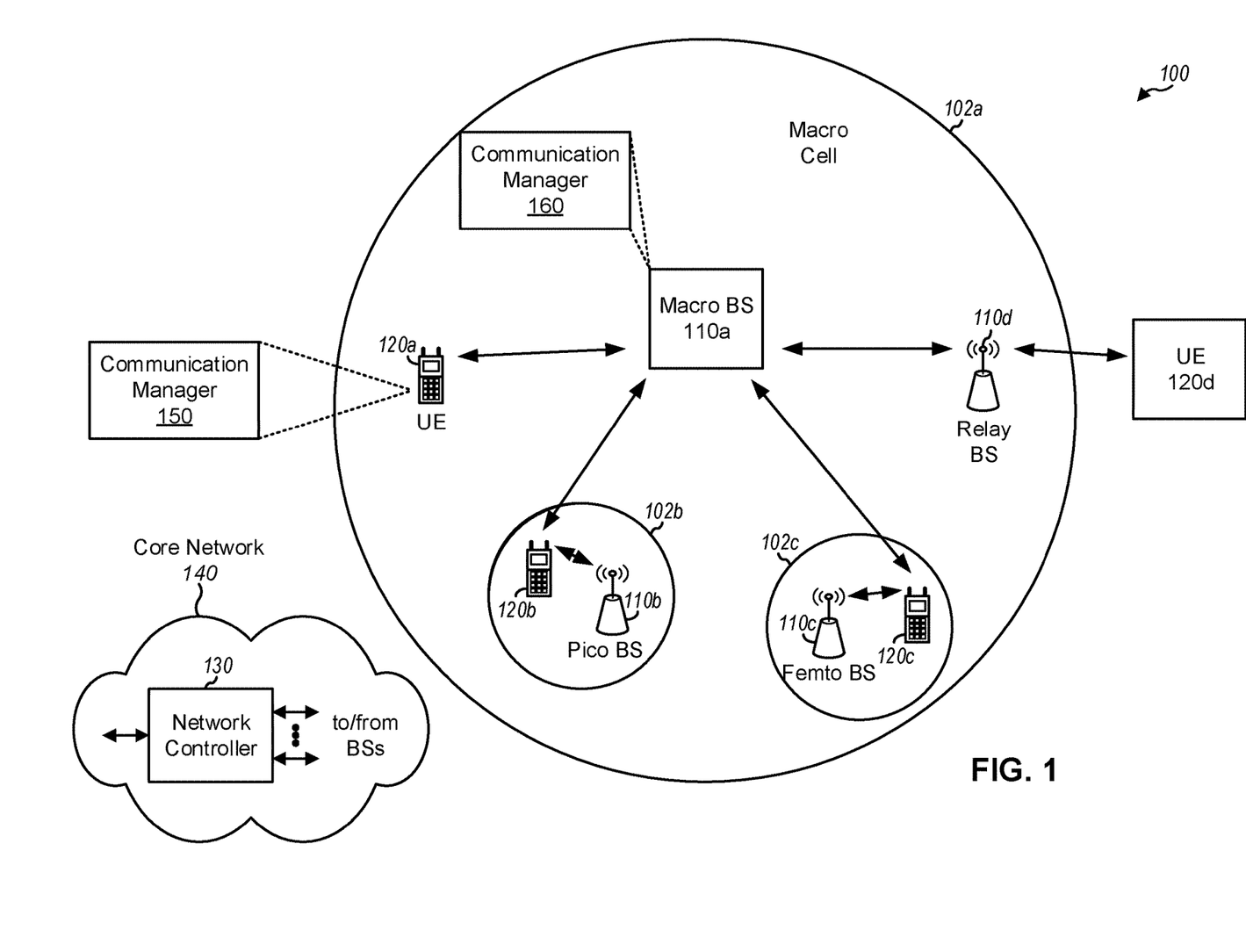
FIG. 1 is a block diagram conceptually illustrating an example of a wireless communication network, in accordance with various aspects of the present disclosure.

FIG. 1 is a diagram illustrating a network 100 in which aspects of the present disclosure may be practiced. The network 100 may be a 5G or NR network or some other wireless network, such as an LTE network. Wireless network 100 may include a number of base stations (BSs) 110 (shown as BS 110a, BS 110b, BS 110c, and BS 110d) and other network entities. A BS is an entity that communicates with user equipment (UEs) and/or other BSs, and may also be referred to as a Node B, an eNB, a gNB, a NR BS, a 5G NB, an access point, a transmit receive point (TRP), an access node (AN), and/or the like. Each BS may provide communication coverage for a particular geographic area. In 3GPP, the term "cell" can refer to a coverage area of a BS and/or a BS subsystem serving this coverage area, depending on the context in which the term is used. As used herein, the term "wireless node" may refer to a base station and/or a user equipment.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells.

In some examples, a cell may not necessarily be stationary, and the geographic area of the cell may move according to the location of a mobile BS. In some examples, the BSs may be interconnected to one another and/or to one or more other BSs or network nodes (not shown) in the access network 100 through various types of backhaul interfaces such as a direct physical connection, a virtual network, a wireless link (e.g., a wireless backhaul link), and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul. In some aspects, network controller 130 may be implemented in a core network 140.

Core network 140 may include one or more devices to communicate with and/or control BSs 110 and/or one or more devices to route packets through core network 140 to one or more other networks. For example, core network 140 may include a mobility management entity (MME), a serving gateway (SGW), a packet data network (PDN) gateway (PGW), a home subscriber server (HSS), a policy charging and rules function (PCRF) device, an authentication, authorization, and accounting (AAA) server, and/or the like.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, etc. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) UEs and/or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. MTC UEs, as well as other types of UEs, may be implemented as narrowband internet of things (NB-IoT) devices. UE 120 may be included inside a housing that houses components of UE 120, such as processor components, memory components, and/or the like. As used herein, the term "wireless node" may refer to a BS 110 and/or a UE 120.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

As shown in FIG. 1, UE 120 may include a communication manager 150. As described in more detail elsewhere herein, UE 120 may determine that a signal characteristic of a unicast signal is better than a signal characteristic of a broadcast signal; transmit a request for update to a MIB and/or a MSIB to be provided to the UE 120 using a unicast signal; receive a grant for the update to the MIB and/or the MSIB based at least in part on scheduling of the update to the MIB and/or the MSIB by a scheduling entity; receive the update to the MIB and/or the MSIB using the unicast signal and based at least in part on the grant; receive information indicating that the request is denied; and/or perform one or more other operations described herein. Communication manager 150 may include one or more components of FIG. 2, as described below.

As shown in FIG. 1, BS 110 may include a communication manager 160. As described in more detail elsewhere herein, BS 110 may determine that a signal characteristic of a unicast signal associated with the UE 120 is better than a signal characteristic of a broadcast signal broadcasted by the base station; transmit, based at least in part on the determination, an update to a MIB and/or an MSIB to the UE 120 using the unicast signal; and/or perform one or more other operations described herein. Communication manager 160 may include one or more components of FIG. 2, as described below.

As indicated above, FIG. 1 is provided as an example. Other examples are possible and may differ from what was described with regard to FIG. 1.

Figure 2:
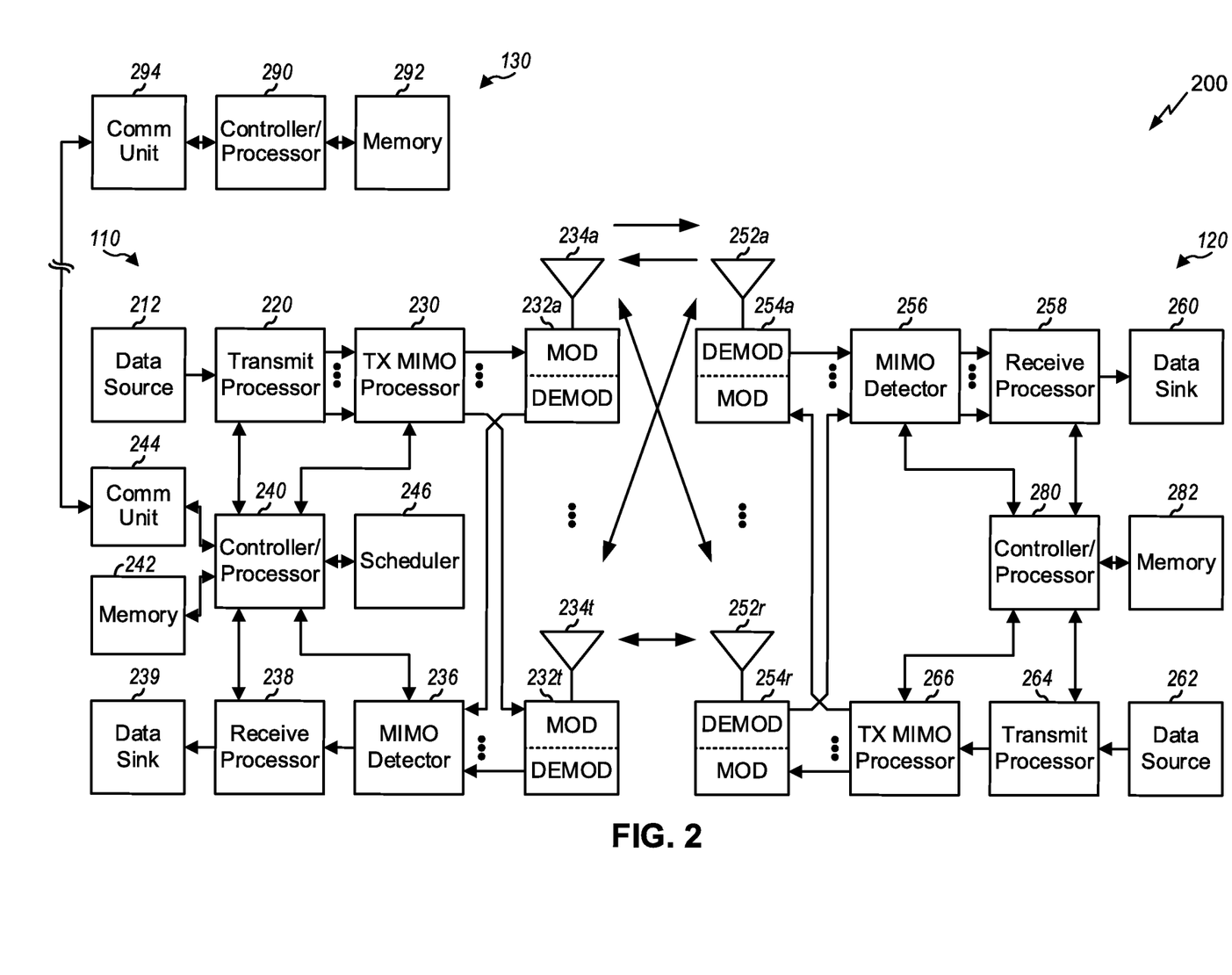
FIG. 2 shows a block diagram conceptually illustrating an example of a base station in communication with a UE in a wireless communication network, in accordance with various aspects of the present disclosure.

FIG. 2 shows a block diagram 200 of a design of BS 110 and UE 120, which may be one of the base stations and one of the UEs in FIG. 1. BS 110 may be equipped with T antennas 234a through 234t, and UE 120 may be equipped with R antennas 252a through 252r, where in general T≥1 and R≥1.

At BS 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI), etc.) and control information (e.g., CQI requests, grants, upper layer signaling, etc.) and provide overhead symbols and control symbols. Transmit processor 220 may also generate reference symbols for reference signals (e.g., demodulation reference signal (DMRS), cell-specific reference signal (CRS), and/or the like) and synchronization signals (e.g., a primary synchronization signal (PSS), a secondary synchronization signal (SSS), and/or the like).

A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from BS 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM, etc.) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like.

On the uplink, at UE 120, a transmit processor 264 may receive and process data from a data source 262 and control information (e.g., for reports comprising RSRP, RSSI, RSRQ, CQI, etc.) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, etc.), and transmitted to BS 110. At BS 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. BS 110 may include communication unit 244 and communicate to network controller 130 via communication unit 244. Network controller 130 may include communication unit 294, controller/processor 290, and memory 292. Memories 242 and 282 may store data and program codes for BS 110 and UE 120, respectively. A scheduler 246 may schedule UEs for data transmission on the downlink and/or uplink.

In some aspects, one or more components of UE 120 may be included in a housing. Controllers/processors 280 any other component(s) in FIG. 2 may direct the operation at UE 120 to perform operations associated with unicast system information delivery for connected mode UEs, as described in more detail elsewhere herein. For example, controller/processor 280 and/or other processors and modules at UE 120, may perform or direct operations of UE 120 to perform one or more operations associated with unicast system information delivery for connected mode UEs. For example, controller/processor 280 and/or other controllers/processors and modules at UE 120 may perform or direct operations of, for example, process 500 of FIG. 5, process 600 of FIG. 6, and/or other processes described herein. In some aspects, one or more of the components shown in FIG. 2 may be employed to perform example process 500, example process 600, and/or other processes for the techniques described herein.

Additionally, or alternatively, the UE 120 may include means for determining that a signal characteristic of a unicast signal is better than a signal characteristic of a broadcast signal; means for transmitting, based at least in part on the determination, a request for a master information block (MIB) and/or a minimum system information block (MSIB) to be provided to the UE using the unicast signal; means for receiving a grant for the MIB and/or the MSIB based at least in part on scheduling of the MIB and/or the MSIB by a scheduling entity; means for receiving the MIB and/or the MSIB using the unicast signal and based at least in part on the grant; and/or means for receiving information indicating that the request is denied. Such means may include one or more components shown in FIG. 2. Additionally, or alternatively, communication manager 150 may include one or more of the means described above and/or one or more components shown in FIG. 2.

As indicated above, FIG. 2 is provided as an example. Other examples are possible and may differ from what was described with regard to FIG. 2.

Figure 3A:
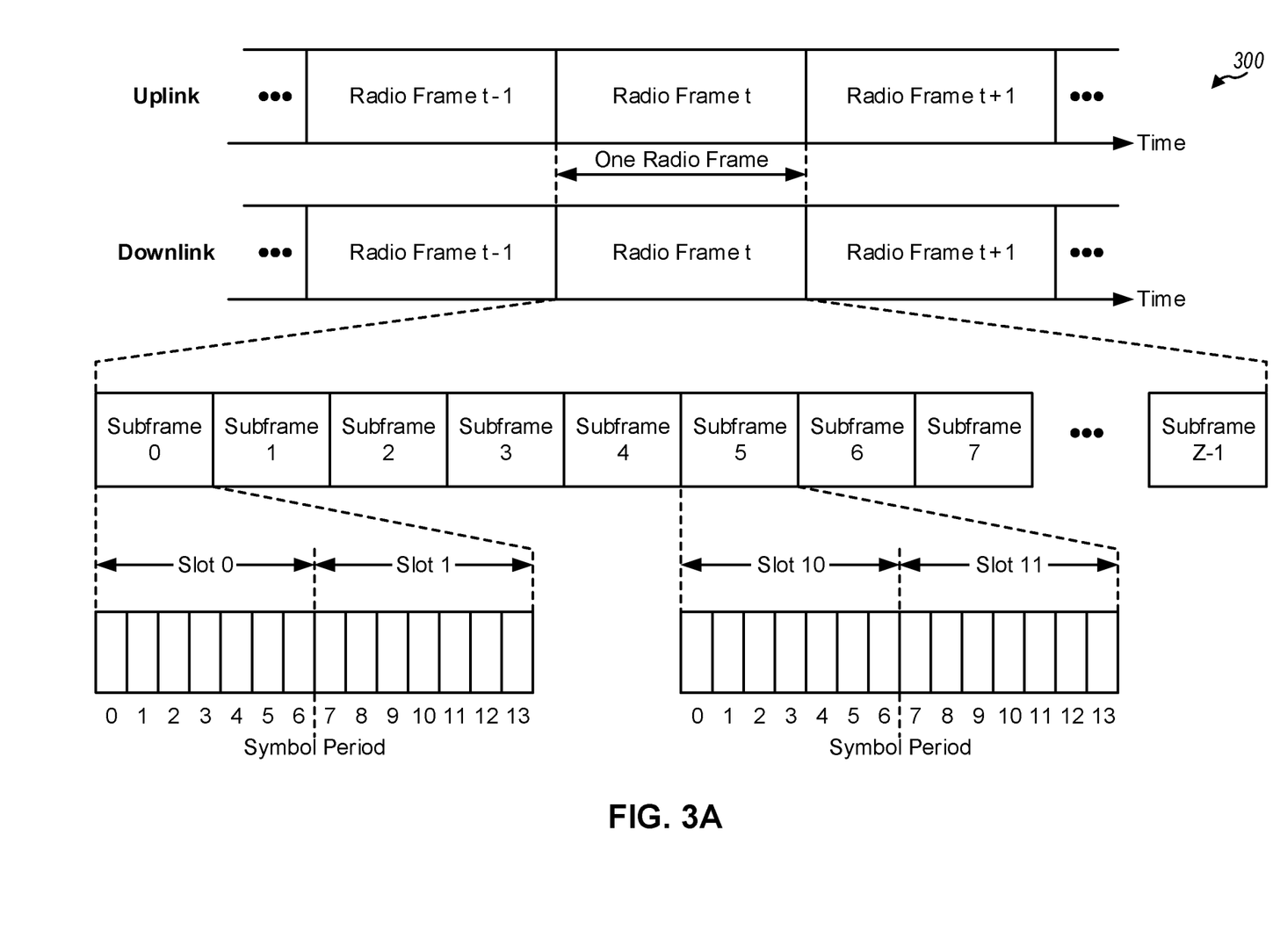
FIG. 3A is a block diagram conceptually illustrating an example of a frame structure in a wireless communication network, in accordance with various aspects of the present disclosure.

FIG. 3A shows an example frame structure 300 for frequency division duplexing (FDD) in a telecommunications system (e.g., NR). The transmission timeline for each of the downlink and uplink may be partitioned into units of radio frames. Each radio frame may have a predetermined duration and may be partitions into a set of Z (Z≥1) subframes (e.g., with indices of 0 through Z−1). Each subframe may include a set of slots (e.g., two slots per subframe are shown in FIG. 3A). Each slot may include a set of L symbol periods. For example, each slot may include seven symbol periods (e.g., as shown in FIG. 3A), fifteen symbol periods, and/or the like. In a case where the subframe includes two slots, the subframe may include 2L symbol periods, where the 2L symbol periods in each subframe may be assigned indices of 0 through 2L−1. In some aspects, a scheduling unit for the FDD may frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol. Additionally, or alternatively, different configurations of wireless communication structures than those shown in FIG. 3A may be used.

In certain telecommunications (e.g., NR), a BS may transmit synchronization signals. For example, a BS may transmit a primary synchronization signal (PSS), a secondary synchronization signal (SSS), a tertiary synchronization signal (TSS), and/or the like, on the downlink for each cell supported by the BS. The PSS and SSS may be used by UEs for cell search and acquisition, and/or may be used by other BSs for automatic deployment in a wireless backhaul network. For example, the PSS may be used by UEs and/or BSs to determine symbol timing, and the SSS may be used by UEs and/or BSs to determine a physical cell identifier, associated with the BS, and frame timing. The BS may also transmit a physical broadcast channel (PBCH). The PBCH may carry some system information, such as system information that supports initial access by UEs and/or BSs.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks), as described below in connection with FIG. 3B.

Figure 3B:
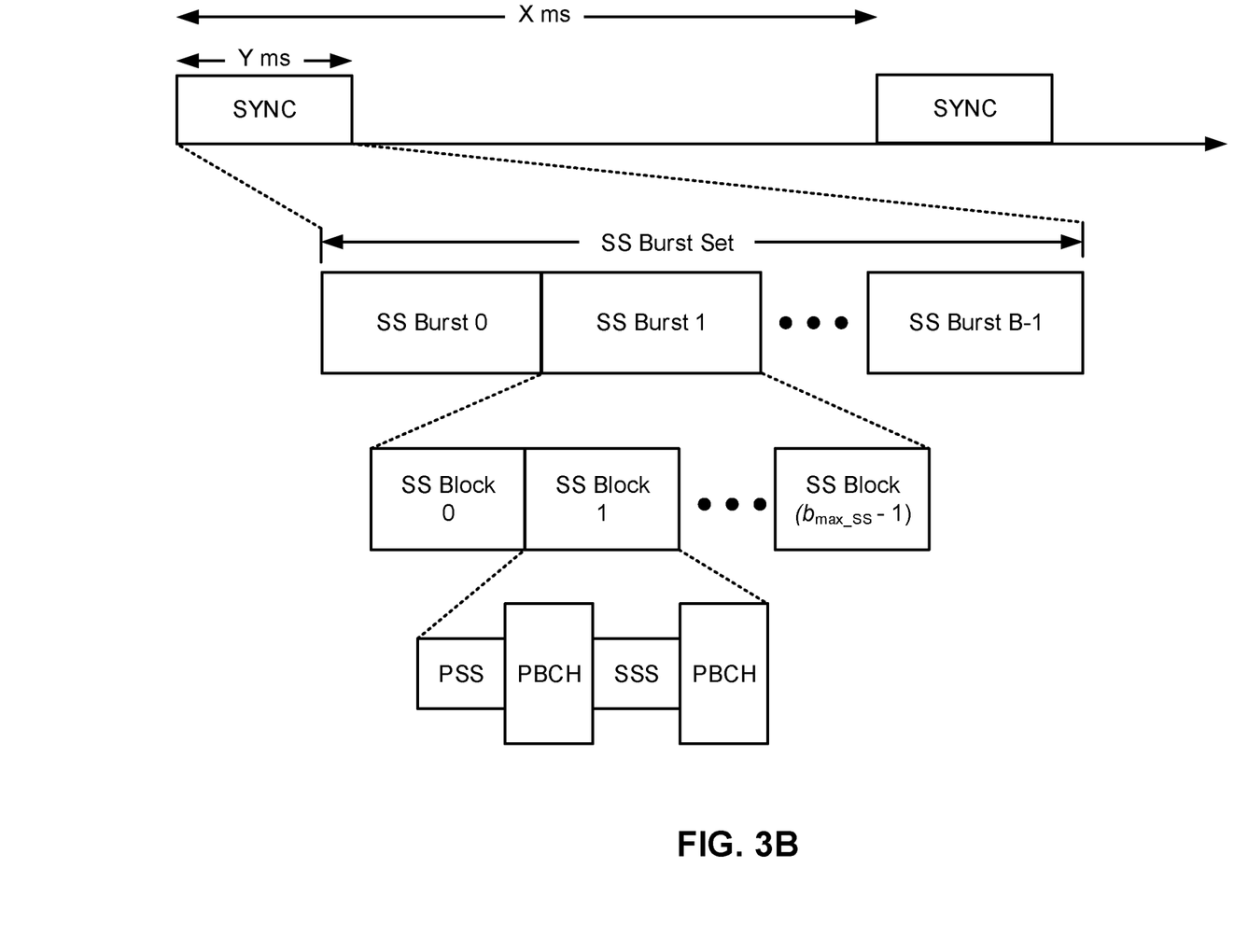
FIG. 3B is a block diagram conceptually illustrating an example synchronization communication hierarchy in a wireless communication network, in accordance with various aspects of the present disclosure.

FIG. 3B is a block diagram conceptually illustrating an example SS hierarchy, which is an example of a synchronization communication hierarchy. As shown in FIG. 3B, the SS hierarchy may include an SS burst set, which may include a plurality of SS bursts (identified as SS burst 0 through SS burst B−1, where B is a maximum number of repetitions of the SS burst that may be transmitted by the base station). As further shown, each SS burst may include one or more SS blocks (identified as SS block 0 through SS block ($b_{max\_SS-1}$), where $b_{max\_SS-1}$ is a maximum number of SS blocks that can be carried by an SS burst. In some aspects, different SS blocks may be beam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, and/or other synchronization signals (e.g., a TSS) and/or synchronization channels. In some aspects, multiple SS blocks are included in an SS burst, and the PSS, the SSS, and/or the PBCH may be the same across each SS block of the SS burst. In some aspects, a single SS block may be included in an SS burst. In some aspects, the SS block may be at least four symbol periods in length, where each symbol carries one or more of the PSS (e.g., occupying one symbol), the SSS (e.g., occupying one symbol), and/or the PBCH (e.g., occupying two symbols).

In some aspects, a synchronization communication (e.g., an SS block) may include a base station synchronization communication for transmission, which may be referred to as a Tx BS-SS, a Tx gNB-SS, and/or the like. In some aspects, a synchronization communication (e.g., an SS block) may include a base station synchronization communication for reception, which may be referred to as an Rx BS-SS, an Rx gNB-SS, and/or the like. In some aspects, a synchronization communication (e.g., an SS block) may include a user equipment synchronization communication for transmission, which may be referred to as a Tx UE-SS, a Tx NR-SS, and/or the like. A base station synchronization communication (e.g., for transmission by a first base station and reception by a second base station) may be configured for synchronization between base stations, and a user equipment synchronization communication (e.g., for transmission by a base station and reception by a user equipment) may be configured for synchronization between a base station and a user equipment.

In some aspects, a base station synchronization communication may include different information than a user equipment synchronization communication. For example, one or more base stations synchronization communications may exclude PBCH communications. Additionally, or alternatively, a base station synchronization communication and a user equipment synchronization communication may differ with respect to one or more of a time resource used for transmission or reception of the synchronization communication, a frequency resource used for transmission or reception of the synchronization communication, a periodicity of the synchronization communication, a waveform of the synchronization communication, a beamforming parameter used for transmission or reception of the synchronization communication, and/or the like.

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (e.g., consecutive symbol periods) during one or more subframes. Additionally, or alternatively, one or more SS blocks of the SS burst may be transmitted in non-consecutive radio resources.

In some aspects, the SS bursts may have a burst period, whereby the SS blocks of the SS burst are transmitted by the BS according to the burst period. In other words, the SS blocks may be repeated during each SS burst. In some aspects, the SS burst set may have a burst set periodicity, whereby the SS bursts of the SS burst set are transmitted by the BS according to the fixed burst set periodicity. In other words, the SS bursts may be repeated during each SS burst set.

The BS may transmit system information, such as system information blocks (SIBs) on a physical downlink shared channel (PDSCH) in certain subframes. The BS may transmit control information/data on a physical downlink control channel (PDCCH) in B symbol periods of a subframe, where B may be configurable for each subframe. The BS may transmit traffic data and/or other data on the PDSCH in the remaining symbol periods of each subframe.

As indicated above, FIGS. 3A and 3B are provided as examples. Other examples are possible and may differ from what was described with regard to FIGS. 3A and 3B.

Figure 4:
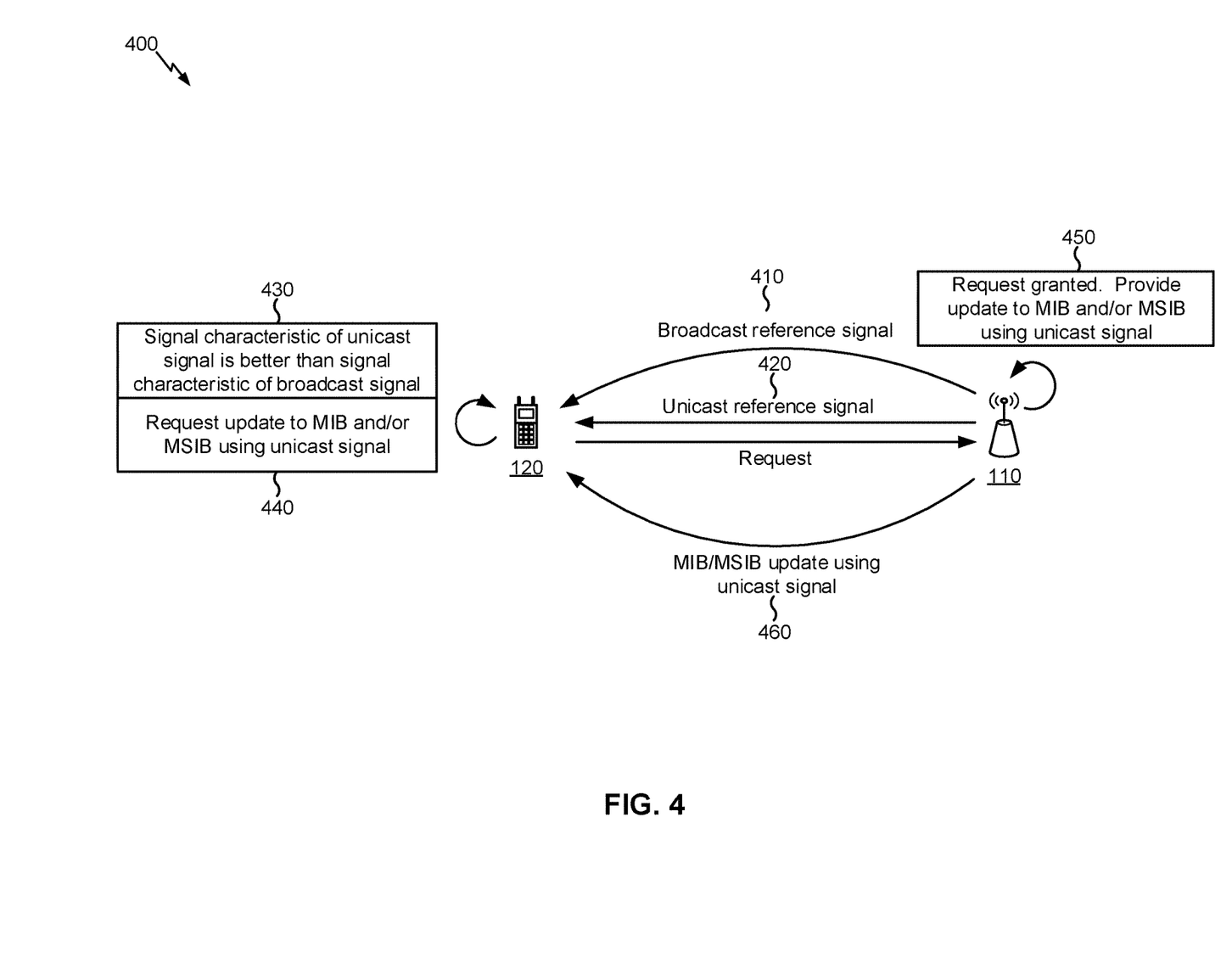
FIG. 4 is diagram illustrating an example of unicast system information delivery for connected mode user equipment, in accordance with various aspects of the present disclosure.

FIG. 4 is diagram illustrating an example 400 of unicast system information delivery for connected mode user equipment, in accordance with various aspects of the present disclosure. For the purpose of FIG. 4, assume that a UE 120 is in an RRC connected mode with a BS 110. For example, assume that the UE 120 has previously performed an RRC connection setup process to establish an RRC connection with the BS 110. Assume further that the UE 120 has configured a unicast connection with the BS 110 (e.g., using mmWave, beamforming, and/or the like).

As shown in FIG. 4, and by reference number 410, a BS 110 may provide a broadcast reference signal. In some aspects, the broadcast reference signal may include a synchronization signal (e.g., a primary synchronization signal, a secondary synchronization signal, a synchronization signal associated with 5G/NR, and/or the like), a reference signal (e.g., a demodulation reference signal (DMRS), a reference signal associated with LTE, a reference signal associated with 5G/NR, and/or the like), or the like. In some aspects, the broadcast reference signal may be provided in a downlink control channel (e.g., a PDCCH).

As shown by reference number 420, the BS 110 may provide a unicast reference signal. In some aspects, the BS 110 may provide the unicast reference signal via a beamformed beam to the UE 120. In some aspects, the unicast reference signal may include a channel state information reference signal, a beamforming reference signal, or a similar signal. In some aspects, the unicast reference signal may be provided in a downlink control channel (e.g., a PDCCH).

As shown by reference number 430, the UE 120 may determine that a signal characteristic of the unicast signal (e.g., the unicast reference signal) is better than a signal characteristic of the broadcast signal (e.g., the broadcast reference signal). For example, the signal characteristic may relate to a channel quality measurement, a channel strength measurement, a signal strength measurement, a signal loss measurement, a quality of service measurement, an interference measurement, and/or the like. In some aspects, the UE 120 may determine that the signal characteristic of the unicast signal is better than the signal characteristic of the broadcast signal (e.g., better by at least a particular amount, better by a threshold value, better by a percentage of improvement, greater than, less than, and/or the like). In some aspects, the determination of whether a signal characteristic is better may be made by the UE 120 and/or the BS 110 (e.g., based at least in part on machine learning, pre-configuration, an algorithm, a comparison, and/or the like).

As shown by reference number 440, the UE 120 may request that an update to the MIB and/or MSIB be provided using a unicast signal. For example, and as shown, the UE 120 may transmit a request to the BS 110. In some aspects, the UE 120 may request that the updates to the MIB and/or MSIB be provided as on-demand system information, such as on-demand OSI.

In some aspects, a single request may result in multiple, different updates being sent using the unicast signal. For example, the BS 110 may provide updates using the unicast signal until a timer expires, until the UE 120 requests cessation of the unicast signal, and/or the like. Additionally, or alternatively, a single request may result in a single update being sent using the unicast signal. For example, the BS 110 may provide a single update based at least in part on the request.

In some aspects, the request may be based at least in part on a value tag associated with the MIB and/or MSIB. For example, the value tag may indicate whether system information, previously received by the UE 120, has changed. When the UE 120 receives a value tag associated with the MIB and/or MSIB, the UE 120 may determine that the MIB and/or MSIB has been updated. In such a case, the UE 120 may transmit the request for the update to the MIB and/or the MSIB to be provided using a unicast signal. In this way, reception performance for updates to the MIB and/or MSIB may be improved over broadcasting such updates. Further, by sending updates to the MIB and/or MSIB via a unicast signal improves network operations and conserves network resources over sending updates to the MIB and/or MSIB via a broadcast signal that might not be properly received and/or decoded by the UE 120.

In some aspects, the UE 120 may provide the request based at least in part on a timer. For example, the timer may indicate a cooldown period for the request. In other words, the UE 120 may not transmit a second request until a length of time, identified by the timer, has elapsed after a first request. In this way, requests for the MIB and/or MSIB updates are regulated, thereby reducing crowding of the unicast signal for UEs experiencing poor broadcast performance and improving network operations.

As shown by reference number 450, the BS 110 may grant the request. For example, the BS 110 may determine that resources associated with a unicast signal are available to provide an update to the MIB and/or MSIB using the unicast signal, and may accordingly grant the request. In some aspects, the BS 110 may deny the request. For example, the BS 110 may deny the request based at least in part on determining that insufficient resources are available. Additionally, or alternatively, the BS 110 may deny the request based at least in part on determining that the UE 120 has transmitted a threshold number of requests (e.g., within a particular time period).

As shown by reference number 460, the BS 110 may provide the update to the MIB and/or MSIB using a unicast signal. For example, when a value of the MIB and/or MSIB changes, the BS 110 may provide information identifying the value to the UE 120 using the unicast signal. Additionally, or alternatively, the BS 110 may provide the MIB and/or MSIB to the UE 120 using the unicast signal. For example, when a value of the MIB and/or MSIB changes, the BS 110 may provide the MIB and/or MSIB (or a portion of the MIB and/or MSIB) to the UE 120 using the unicast signal. In some aspects, the UE 120 may receive updates to the MIB and/or MSIB using the unicast signal until a request is transmitted, by the UE, to revert to the broadcast signal. In some aspects, the UE 120 may receive the updates using the unicast signal for a particular length of time. In some aspects, the UE 120 may receive the updates using the unicast signal until the BS 110 determines that the updates are no longer to be provided using the unicast signal. In some aspects, the UE 120 may receive a single update using the unicast signal for a single request transmitted to the BS 110. In this case, if the UE 120 is to receive a subsequent update using the unicast signal, the UE 120 may send an additional request, to the BS 110, to receive the subsequent update.

In some aspects, the UE 120 may perform radio link monitoring (RLM), which may be impacted by techniques and apparatuses described herein. RLM is used to track a radio link condition so appropriate steps can be taken if radio link failure (RLF) is identified. RLM may be based at least in part on reference signals included in at least one candidate PDCCH. For example, a PDCCH for an MSIB may be used as a candidate PDCCH. Additionally, or alternatively, a PDCCH for the unicast signal may be used as a candidate PDCCH. For some aspects described herein, the MSIB may be provided on a unicast beam, so RLM performance may increase due to the improved coverage relative to the broadcast MSIB. Therefore, the UE 120 may use a higher weight for reference signals associated with the unicast signal than for reference signals associated with the broadcast signal, which improves accuracy of RLM for the unicast signal case.

As indicated above, FIG. 4 is provided as an example. Other examples are possible and may differ from what was described with regard to FIG. 4.

Figure 5:
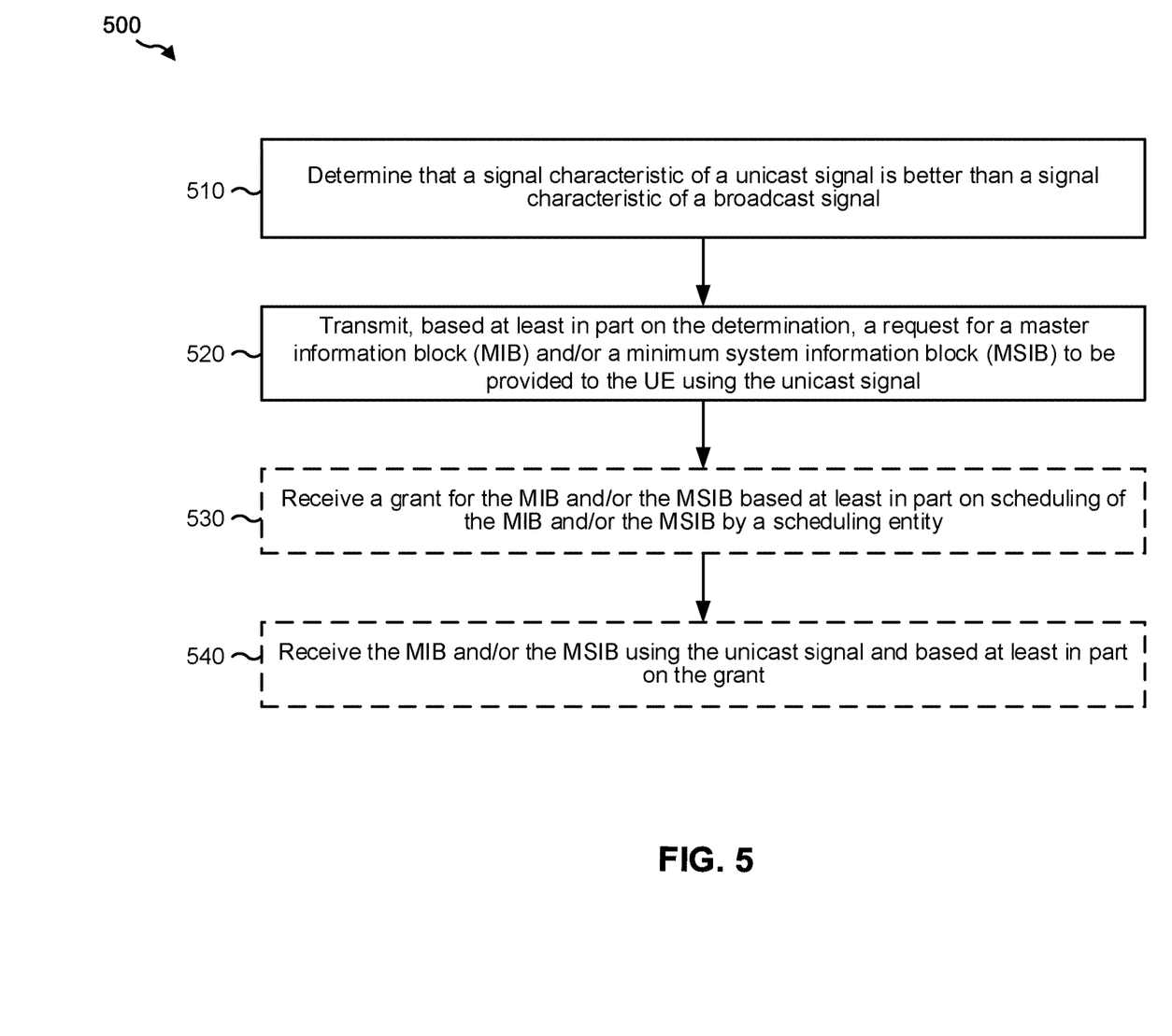
FIG. 5 is a diagram illustrating an example process performed, for example, by a user equipment, in accordance with various aspects of the present disclosure.

FIG. 5 is a diagram illustrating an example process 500 performed, for example, by a user equipment (e.g., UE 120), in accordance with various aspects of the present disclosure.

As shown in FIG. 5, in some aspects, process 500 may include determining that a signal characteristic of a unicast signal is better than a signal characteristic of a broadcast signal (block 510). For example, the user equipment (e.g., using controller/processor 280 and/or the like) may determine that a signal characteristic of a unicast signal is better than a signal characteristic of a broadcast signal. In some aspects, the user equipment may be in an RRC connected mode prior to making the determination. In some aspects, the user equipment may be in an RRC connected mode while making the determination.

As further shown in FIG. 5, in some aspects, process 500 may include transmitting, based at least in part on the determination, a request for a master information block (MIB) and/or a minimum system information block (MSIB) to be provided to the UE using the unicast signal (block 520). For example, the user equipment (e.g., using controller/processor 280, transmit processor 264, TX MIMO processor 266, MOD 254, antenna 252, and/or the like) may transmit a request for a MIB and/or a MSIB to be provided to the user equipment using the unicast signal. In some aspects, the user equipment may request that an update to the MIB and/or MSIB be provided using the unicast signal.

As further shown in FIG. 5, in some aspects, process 500 may include receiving a grant for the MIB and/or the MSIB based at least in part on scheduling of the MIB and/or the MSIB by a scheduling entity (block 530). For example, the user equipment (e.g., using antenna 252, DEMOD 254, MIMO detector 256, receive processor 258, controller/processor 280, and/or the like) may receive a grant for the MIB and/or MSIB (e.g., for an update to the MIB and/or the MSIB). The user equipment may receive the grant from a scheduling entity that provides the MIB and/or MSIB, such as a base station (e.g., the BS 110 and/or the like).

As further shown in FIG. 5, in some aspects, process 500 may include receiving the MIB and/or the MSIB using the unicast signal and based at least in part on the grant (block 540). For example, the user equipment (e.g., using antenna 252, DEMOD 254, MIMO detector 256, receive processor 258, controller/processor 280, and/or the like) may receive the MIB and/or the MSIB using the unicast signal and based at least in part on the grant, as described in more detail elsewhere herein.

Process 500 may include additional aspects, such as any single aspect or any combination of aspects described below and/or in connection with one or more other processes described elsewhere herein.

In some aspects, the user equipment receives the MIB and/or the MSIB using the unicast signal until a request is transmitted, by the wireless communication device, to revert to the broadcast signal. In some aspects, the user equipment may receive information indicating that the request is denied. In some aspects, the request is further transmitted based at least in part on a value tag having been received by the wireless communication device. In some aspects, the request is further transmitted based at least in part on a timer associated with the wireless communication device. In some aspects, the unicast signal is a millimeter wave signal. In some aspects, the user equipment is configured to perform radio link monitoring (RLM) of the unicast signal and the broadcast signal with a higher weight for the unicast signal than for the broadcast signal. In some aspects, the signal characteristic of the unicast signal is based at least in part on a channel state information reference signal. In some aspects, the signal characteristic of the broadcast signal is based at least in part on at least one of a channel state information reference signal, a synchronization signal, a demodulation reference signal, or a combination thereof. In some aspects, the request is for a single update to the MIB or MSIB to be provided using the unicast signal. In some aspects, the user equipment is in a radio resource control (RRC) connected mode prior to or while determining that the signal characteristic of the unicast signal is better than the signal characteristic of the broadcast signal.

It will be appreciated from process 500 described above that, in some aspects, the UE 120 may transmit, based at least in part on one or more signal characteristics of a unicast signal and one or more signal characteristics of a broadcast signal, a request for an update to a master information block (MIB) or a minimum system information block (MSIB) to be provided to the UE 120 using the unicast signal. For example, the UE 120 may determine that the one or more signal characteristics of the unicast signal are better than the one or more signal characteristics of the broadcast signal (e.g., at block 510). In this case, the UE 120 may transmit, based at least in part on the determination, the request for the update to the MIB or the MSIB to be provided to the UE 120 using the unicast signal (e.g., at block 520).

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
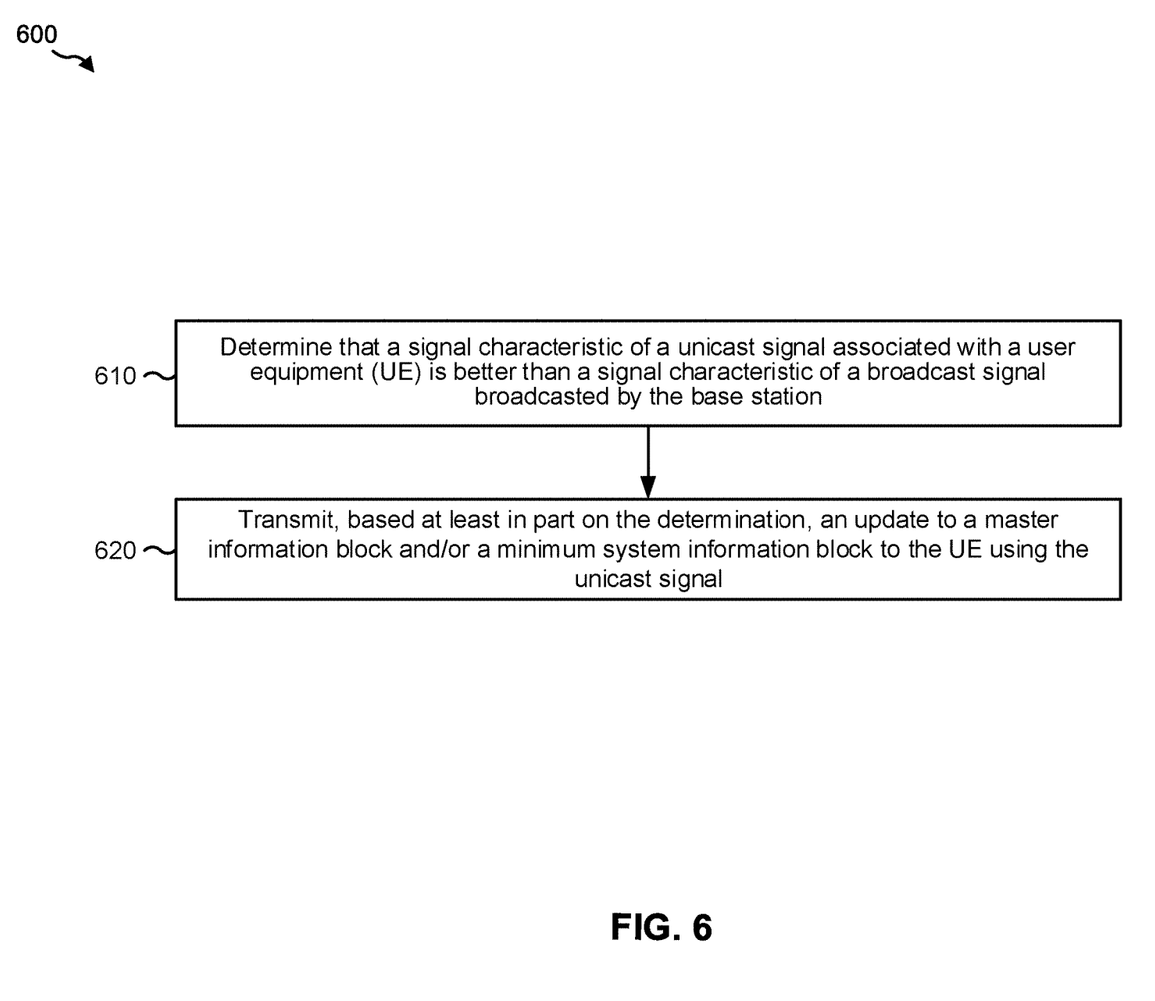
FIG. 6 is a diagram illustrating an example process performed, for example, by a base station, in accordance with various aspects of the present disclosure.

FIG. 6 is a diagram illustrating an example process 600 performed, for example, by a base station (e.g., BS 110), in accordance with various aspects of the present disclosure.

As shown in FIG. 6, in some aspects, process 600 may include determining that a signal characteristic of a unicast signal associated with a user equipment (UE) is better than a signal characteristic of a broadcast signal broadcasted by the base station (block 610). For example, the base station (e.g., using controller/processor 240 and/or the like) may determine that a signal characteristic of a unicast signal associated with a UE is better than a signal characteristic of a broadcast signal broadcasted by the base station. In some aspects, the signal characteristic of the unicast signal and/or the signal characteristic of the broadcast signal may be based at least in part on measurement information collected by the UE (or a different UE), such as RSRP for a unicast signal between the UE and the base station, RSRP for a unicast signal between the different UE and the base station, or the like. For example, the UE (or the different UE) may report measurement information for the unicast signal and/or the broadcast signal As further shown in FIG. 6, in some aspects, process 600 may include transmitting, by the base station and based at least in part on the determination, an update to a master information block (MIB) and/or a minimum system information block (MSIB) to the UE using the unicast signal (block 620). For example, the base station (e.g., using controller/processor 240, transmit processor 220, TX MIMO processor 230, MOD 232, antenna 234, and/or the like) may transmit, based at least in part on the determination, an update to a master information block (MIB) and/or a minimum system information block (MSIB) to the UE using the unicast signal.

Process 600 may include additional aspects, such as any single aspect or any combination of aspects described below and/or in connection with one or more other processes described elsewhere herein.

In some aspects, the base station may transmit an entire MIB and/or MSIB using the unicast signal. Additionally, or alternatively, the base station may transmit an updated portion of the MIB and/or MSIB. In some aspects, the base station may transmit a single MIB and/or MSIB using the unicast signal. In some aspects, the base station may transmit multiple, different MIBs and/or MSIBs (e.g., for a particular length of time, until an indication is received from the UE 120 to cease transmitting the MIB and/or MSIB using the unicast signal, until channel conditions improve, etc.). In this way, a base station can unilaterally determine to transmit a MIB and/or MSIB using a unicast signal, which improves reception of the MIB and/or MSIB and, therefore, improves performance of the base station and the UE.

It will be appreciated from process 600 described above that, in some aspects, the BS 110 may transmit, based at least in part on one or more signal characteristics of a unicast signal associated with the UE 120 and one or more signal characteristics of a broadcast signal broadcasted by the BS 110, an update to a master information block (MIB) or a minimum system information block (MSIB) to the UE 120 using the unicast signal. For example, the BS 110 may determine that the one or more signal characteristics of the unicast signal associated with the UE 120 are better than the one or more signal characteristics of the broadcast signal broadcasted by the BS 110 (e.g., at block 610); and the UE 120 may transmit, based at least in part on the determination that the one or more signal characteristics of the unicast signal associated with the UE 120 are better than the one or more signal characteristics of the broadcast signal broadcasted by the BS 110, the update to the MIB or the MSIB to the UE 120 using the unicast signal (e.g., at block 620).

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the aspects to the precise form disclosed. Modifications and variations are possible in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of possible aspects. In fact, many of these features may be combined in ways not specifically recited in the claims and/or disclosed in the specification. Although each dependent claim listed below may directly depend on only one claim, the disclosure of possible aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," and/or the like are intended to be open-ended terms. Further, the phrase "based at least in part on" is intended to mean "based, at least in part, on" unless explicitly stated otherwise.

What is claimed is:

1. A method of wireless communication, comprising:
   determining, by user equipment (UE), that a signal characteristic of a unicast signal is better than a signal characteristic of a broadcast signal by at least a particular amount or by a percentage of improvement; and
   transmitting, by the UE and based at least in part on the determination, a request for an update to a master information block (MIB) or a minimum system information block (MSIB) to be provided to the UE using the unicast signal.

2. The method of claim 1, further comprising:
   receiving a grant for the update to the MIB or the MSIB based at least in part on scheduling of the update to the MIB or the MSIB by a scheduling entity; and
   receiving the update to the MIB or the MSIB using the unicast signal and based at least in part on the grant.

3. The method of claim 2, wherein the UE receives the update to the MIB or the MSIB using the unicast signal until a request is transmitted, by the UE, to revert to the broadcast signal.

4. The method of claim 1, further comprising receiving information indicating that the request is denied.

5. The method of claim 1, wherein the request is further transmitted based at least in part on a value tag having been received by the UE.

6. The method of claim 1, wherein the request is further transmitted based at least in part on a timer associated with the UE.

7. The method of claim 1, wherein the unicast signal is a millimeter wave signal.

8. The method of claim 1, wherein the UE is configured to perform radio link monitoring (RLM) of the unicast signal and the broadcast signal with a higher weight for the unicast signal than for the broadcast signal.

9. The method of claim 1, wherein the signal characteristic of the unicast signal is based at least in part on a channel state information reference signal.

10. The method of claim 1, wherein the signal characteristic of the broadcast signal is based at least in part on at least one of a channel state information reference signal, a synchronization signal, a demodulation reference signal, or a combination thereof.

11. The method of claim 1, wherein the request is for a single update to the MIB or MSIB to be provided using the unicast signal.

12. The method of claim 1, wherein the UE is in a radio resource control connected mode prior to or while determining that the signal characteristic of the unicast signal is better than the signal characteristic of the broadcast signal.

13. A method of wireless communication performed by a base station, comprising:
   determining that a signal characteristic of a unicast signal associated with a user equipment (UE) is better than a signal characteristic of a broadcast signal broadcasted by the base station by at least a particular amount or by a percentage of improvement; and
   transmitting, by the base station and based at least in part on the determination, an update to a master information block (MIB) or a minimum system information block (MSIB) to the UE using the unicast signal.

14. The method of claim 13, wherein the signal characteristic of the unicast signal and the signal characteristic of the broadcast signal are based at least in part on measurement information for the unicast signal and the broadcast signal.

15. A user equipment (UE) for wireless communication, comprising:
   a memory; and
   one or more processors operatively coupled to the memory, the memory and the one or more processors configured to:
      determine that a signal characteristic of a unicast signal is better than a signal characteristic of a broadcast signal by at least a particular amount or by a percentage of improvement; and
      transmit, based at least in part on the determination, a request for an update to a master information block (MIB) or a minimum system information block (MSIB) to be provided to the UE using the unicast signal.

16. The UE of claim 15, wherein the memory and the one or more processors are further to:
   receive a grant for the update to the MIB or the MSIB based at least in part on scheduling of the update to the MIB or the MSIB by a scheduling entity; and
   receive the update to the MIB or the MSIB using the unicast signal and based at least in part on the grant.

17. The UE of claim 16, wherein the UE is configured to receive the update to the MIB or the MSIB using the unicast signal until a request is transmitted, by the UE, to revert to the broadcast signal.

18. The UE of claim 15, wherein the memory and the one or more processors are further configured to receive information indicating that the request is denied.

19. The UE of claim 15, wherein the request is further transmitted based at least in part on a value tag having been received by the UE.

20. The UE of claim 15, wherein the request is further transmitted based at least in part on a timer associated with the UE.

21. The UE of claim 15, wherein the unicast signal is a millimeter wave signal.

22. The UE of claim 15, wherein the UE is configured to perform radio link monitoring (RLM) of the unicast signal and the broadcast signal with a higher weight for the unicast signal than for the broadcast signal.

23. The UE of claim 15, wherein the signal characteristic of the unicast signal is based at least in part on a channel state information reference signal.

24. The UE of claim 15, wherein the signal characteristic of the broadcast signal is based at least in part on at least one of a channel state information reference signal, a synchronization signal, a demodulation reference signal, or a combination thereof.

25. The UE of claim 15, wherein the request is for a single update to the MIB or MSIB to be provided using the unicast signal.

26. The UE of claim 15, wherein the UE is in a radio resource control connected mode prior to or while determining that the signal characteristic of the unicast signal is better than the signal characteristic of the broadcast signal.

27. A base station for wireless communication, comprising:

a memory; and one or more processors operatively coupled to the memory, the memory and the one or more processors configured to:

determine that a signal characteristic of a unicast signal associated with a user equipment (UE) is better than a signal characteristic of a broadcast signal broadcasted by the base station by at least a particular amount or by a percentage of improvement; and transmit, based at least in part on the determination, an update to a master information block (MIB) or a minimum system information block (MSIB) to the UE using the unicast signal.

28. The base station of claim 27, wherein the signal characteristic of the unicast signal and the signal characteristic of the broadcast signal are based at least in part on measurement information for the unicast signal and the broadcast signal.

* * * * *